United States Patent [19]

Bürmann

[11] Patent Number: 5,671,595
[45] Date of Patent: Sep. 30, 1997

[54] RECEIVING TABLE FOR HARVESTERS

[75] Inventor: Dominik Bürmann, Verl, Germany

[73] Assignee: claas ohg beschraekt haftende offene handelsgesellschaft, Harsewinkel, Germany

[21] Appl. No.: 496,398

[22] Filed: Jun. 29, 1995

[30] Foreign Application Priority Data

Aug. 4, 1994 [DE] Germany ............................ 44 28 857.3

[51] Int. Cl.⁶ .................................................. A01D 47/00
[52] U.S. Cl. .................................. 56/208; 56/119; 56/466
[58] Field of Search ............................... 56/208, 466, 51, 56/52, 119, 120, 121

[56] References Cited

U.S. PATENT DOCUMENTS 3,561,198  2/1971  Herbsthoffer .
4,000,600  1/1977  Butler .
4,910,946  3/1990  Underwood .

Primary Examiner—Terry Lee Melius
Assistant Examiner—Christopher J. Novosad
Attorney, Agent, or Firm—Michael J. Striker

[57] ABSTRACT

A receiving table for harvesters has a central part mountable on a harvester, two side parts connected with the central part and having an upper main support and a lower main support, a rear wall and a bottom wall mounted on the main supports, a plurality of transverse supports connected with the lower main support and connecting the side parts with the central part at separating and connecting points as well as with the transverse supports, and a plurality of connecting flanges arranged on the rear wall and connecting the upper and the lower main supports with one another.

4 Claims, 2 Drawing Sheets

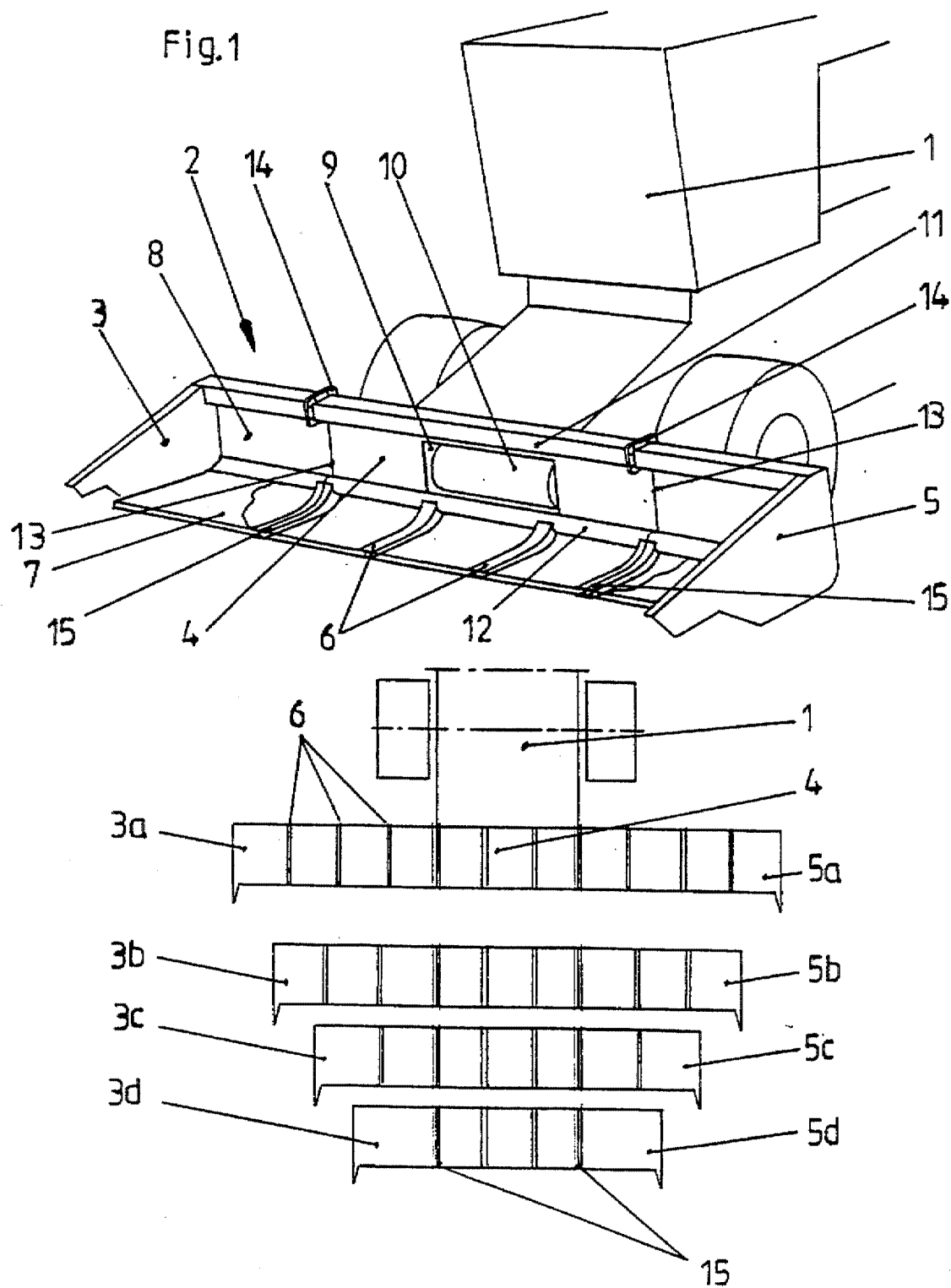

RECEIVING TABLE FOR HARVESTERS

BACKGROUND OF THE INVENTION

The present invention relates to a multi-part receiving table for harvesters, such as harvester threshers, field choppers, etc.

The efficiency of a stalk product harvester, such as harvester threshers, field choppers, etc., is decisively determined by their working width. Agricultural machines must be produced with different working widths in dependence on a harvested product, the conditions of use in corresponding areas, and on the requirements for the transportation on streets, and roadways. In view of the above identified conditions and presumptions, the constant expansion of the working width is needed naturally within certain limits. Moreover, many problems result from the technological manufacturing processes, namely the economical manufacture of receiving tables with great working widths, including working elements to be received by the table such as cutter bars, drawing-in screws, pick-up drums, spools, etc. These problems must be resolved often by special individual structural features, which also cause additional high costs.

Various solutions have been proposed to allow transportation of self-propelling harvesters having a great working widths, over public streets and roadways. These solutions were directed toward changing the working width, for example for changing the width of the receiving table including the cross-bar, the drawing-in screw and the spool. These solutions as a rule include a central part which is fixedly mounted on the machine frame, and position-changeable side parts. For producing the maximum allowable transportation width, the position-changeable side parts of the receiving table, including the cutting mechanism segments, the drawing-in screws, and the spools, etc., are folded by a hydraulic working cylinder-piston unit to a vertical transporting position or turned in a traveling direction forwardly before the fixed central part.

In accordance with a further modification of these solutions, the central part of the receiving table is also arranged in a position-changeable manner. For the conversion of the harvester from a great working width into the permissible transportation width, the central part is moved to a higher horizontal plane, while the position-changeable side parts are turned in the traveling direction of the harvester under the lifted central part.

With such devices, a fast, uncomplicated and simple conversion of the harvester to the maximum permissible transportation width is possible. The technical and technological equipment which is required for this purpose is however very substantial and introduces the high cost factor, and the presumptions for the operation of the working element arranged in the receiving table are provided only in the end positions of the receiving table, or in other words with its full working width.

The solutions for the receiving tables with changeable working widths which belong to this group are also disclosed in U.S. Pat. No. 4,910,946 and U.S. Pat. No. 3,561,198. The receiving table in U.S. Pat. No. 4,910,946 has a central part and position-changeable side parts which are received by the central part, moved by a hydraulic working cylinder-piston unit telescopably in their working position, and guided during the adjusting movement. The receiving table has a lower supporting beam formed of a hollow profiled member and a bottom and rear wall formed of one piece with it. In addition to the problem that this receiving table ensures the operation of the working elements of the cutting mechanism only in their end positions, it is evident that especially for great working widths the required bending and torsion strength of the receiving table is not guaranteed. The receiving tables for harvesters with working widths which deviate from one another cannot be produced in accordance with this principle.

U.S. Pat. No. 3,561,198 discloses a receiving table with a changeable working width, which is formed similarly to the solution disclosed in U.S. Pat. No. 4,910,946. The side parts which are subdivided into a plurality of portions are also moveable telescopably to their end positions which correspond to the working position of the receiving table. The receiving table has bottom and rear walls which are formed of one piece, and also upper and lower supporting beams. The supporting beams simultaneously receive the supporting beams for the position-changeable side parts, analogously to a telescoping rod. Plates are locally arranged perpendicularly to the bottom and rear walls in the region of the connecting points of the side parts to the central part of the receiving table, for supporting and guiding supporting beams telescopably engageable in one another. In addition to the above mentioned disadvantages, in this embodiment the required bending and torsion strength of the receiving table is also not provided.

German patent document DE 26 15 576 C2 discloses a proposal for a bending and torsion resistant threshing table for a harvester thresher. The receiving or threshing table has an upper box-shaped main support formed as a hollow support, and a plurality of C-shaped ribs fixedly arranged on it and spaced from one another. The C-shaped ribs are covered in the bottom region by the bottom wall of the receiving table so as to form a hollow support located perpendicular to the main support. This hollow support extends over the entire width of the receiving table, in correspondence with the number of the ribs. With respect to the bending and twisting strength, this receiving table has important advantages over the previously proposed solutions. Its structural design is however fixed with respect to a predetermined working width. Deviations from it require structural and manufacturing changes of the proposed solution. Moreover, the mounting of this receiving table is relatively expensive and requires high manufacturing costs.

SUMMARY OF THE INVENTION

Accordingly, it is an object of the present invention to provide a receiving table for harvesters, which avoids the disadvantages of the prior art.

More particularly, it is an object of the present invention to provide a receiving table which can be produced with low costs and at the same time is bending and torsion resistant, and also can be assembled within a predetermined range in a modular way for harvesters with different working widths to form a fully functional and compact structural group.

In keeping with these objects and with others which will become apparent hereinafter, one feature of the present invention resides, briefly stated, in a receiving table for a harvester, including a central part mounted on a harvester in a known manner and two side parts connectable with the central part and each having an upper and lower main supports with rear and bottom walls mounted on the supports, wherein in accordance with the present invention a transverse support is fixed on the lower main support, the side parts and the central part are connected at their separating and connecting locations correspondingly with a transverse support, and connecting flanges which connect the upper and lower main supports with one another are arranged on the rear wall.

By the subdivision of the receiving table into a central part and side parts connectable with the central part through a connecting flange in releasable connection, individual segments are produced which in the process of their manufacture can be dealt with in relatively simple manner and can be assembled during mounting with simple means to form a single independent structural group. Simultaneous the conditions are provided so that the receiving table can be available or prepared in a modular manner for harvesters with different working widths without substantial changes of the production process.

The proposed arrangement of the transverse support on the lower main support of the receiving table which has an upper and lower main support, and the formation and arrangement of the transverse support and the connecting flange on the separating and connecting points between the central part and the side parts guarantees that the forces which act on the receiving table in the working process are taken up reliably and transferred through the main support to the machine frame of the harvester.

In general, the proposed receiving table has a cost favorable, rational structural design. With the use of hollow profiled members for the main support and conventional commercial profiled members for the transverse support, a high stability and strength are obtained without substantially increasing the weight in comparison with the one-piece receiving tables.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a schematic view of a harvester with the receiving table in accordance in the present invention;

FIG. 2 is a view showing the receiving table with different working widths assembled in accordance with the present invention.

DESCRIPTION OF THE PREFERRED EMBODIMENTS

Figure 3:
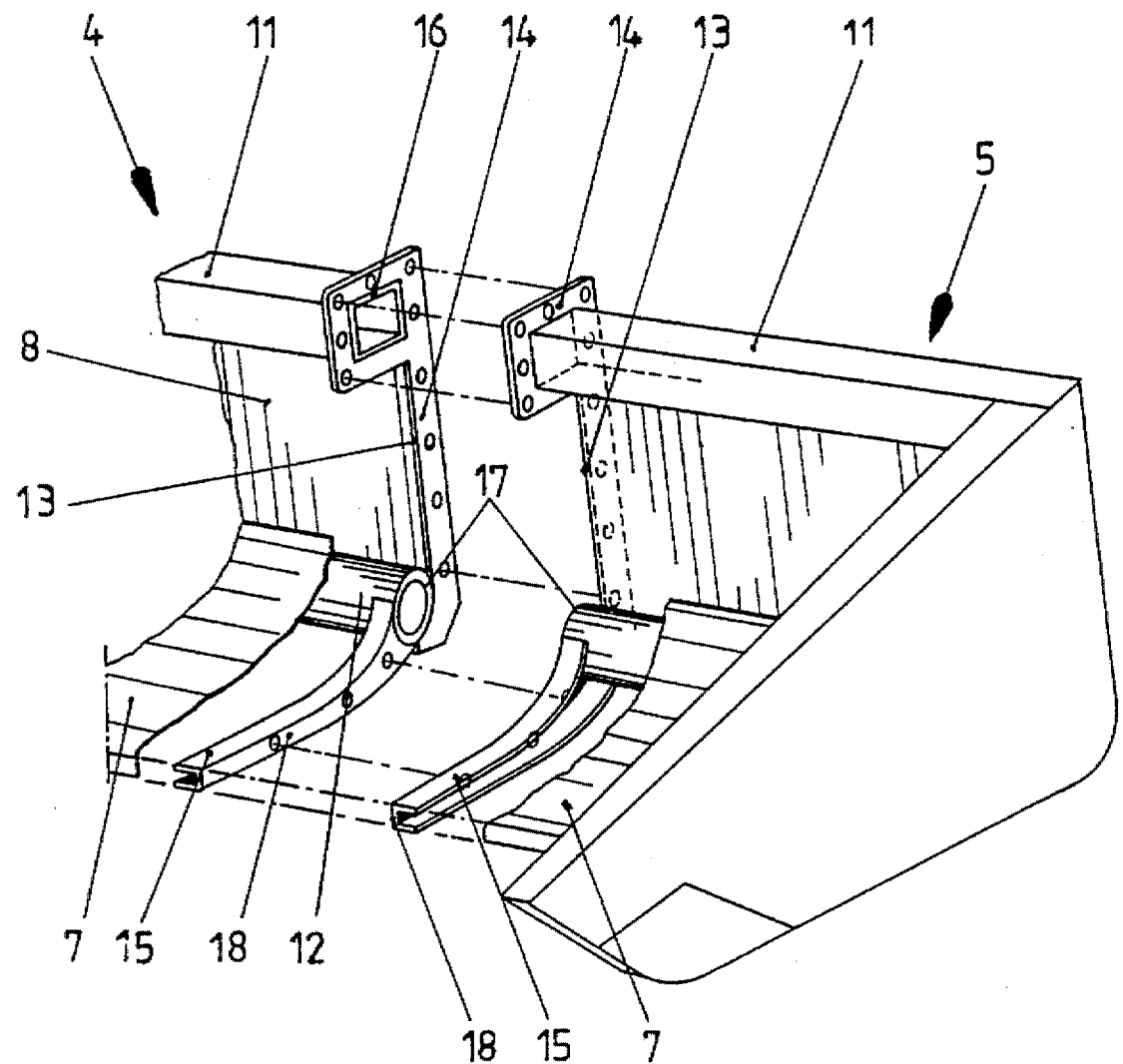
FIG. 3 is a view showing the receiving table with connections between the central part and the side parts in accordance with the present invention.

A receiving table shown in FIG. 1 is provided for working elements of a cutting mechanism of a harvester, such as cutter bars, drawing-in screws, spools, etc. which are not shown in the drawings, is mounted in a known manner on a harvester 1. Its rear wall 8 has a drawing-in opening through which the harvested product is supplied by a lattice conveyor 10 to a threshing mechanism of the harvester.

The receiving table 2 has a central part 4 and side parts 3 and 5 connected with the central part by connecting flanges 14 and by transverse supports 15 in bending and torsion resistant manner. The central part 4 is available over a constant width. Moreover, the receiving table for harvesters with different working widths can be obtained by a modular mounting of the central part 4 with constant with dimensions, with the side parts 3a–3d and 5a–5d as shown in FIG. 2 so as to make available different widths dimensions.

In accordance with an alternative embodiment, the width dimension of the side parts 3a–3d and 5a–5d is fixed, while the width of the central part 4 is varied in correspondence with special requirements.

The central part 4 and the side parts 3; 3a–3d; 5; 5a–5d each have an upper support 11 and a lower support 12 which are preferably formed of a hollow profiled member. The lower bottom wall 7 and the rear wall 8 are tangentially mounted on each main support 11, 12. The transverse supports 6 which contribute to a high bending and torsion resistance are mounted in the lower main support 12.

The side parts 3; 3–3d; 5; 5a–5d and the central part 4 are connected at separating and connecting points 13 with a transverse support 15 which is also fixedly connected to the lower main support 12 and is simultaneously formed as a connecting flange. The transverse supports 6 and 15 are covered by the bottom wall 7 which is tangentially connected to the lower main support, so that in mounted condition the assembled receiving table 2 is formed as a projection-free receiving table for supplying the harvested product to the harvester. Connecting flanges 14 are provided on the separating and connecting points 13 between the central part 4 and the side walls 3 and 5 on the rear wall 8. The connecting flanges 14 are also connected with both main supports 11 and 12 as shown in FIG. 3.

While the transverse support 6 is composed preferably of a double T-shaped profiled member, the transverse supports 15 have preferably a U-shaped profiled member. As can be seen from FIG. 3, the transverse supports 15 are fixedly connected to the lower main support 2 so that they lie with their surfaces 18 on one another and can be clamped with one another as flanges by means of clamping screws. The transverse supports 15 and the connecting flanges 14 are connected to the upper and lower main supports 11, 12 and to the rear wall 8 in one plane so as to lie flush with the end surfaces 16 and 17. Thereby a uniform closed clamping plane is produced, in which the parts 3, 4, 5 of the receiving table 2 to be connected come to a full surface abutment against one another.

The uniformly closed clamping plane simultaneously provide the guarantee for a fixed form-locking connection between the central part 4 and the side parts 3 and 5, that is it is dispensable for a bending and torsion-resistant receiving table and for the transmission of the forces acting on the receiving table to the machine frame of the harvester 1.

It will be understood that each of the elements described above, or two or more together, may also find a useful application in other types of constructions differing from the types described above.

While the invention has been illustrated and described as embodied in a receiving table for harvesters, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. A receiving table for harvesters, comprising a central part mountable on a harvester; two side parts connected with said central part, said central part and said two side parts each having an upper main support, a lower main support, a rear wall and a bottom wall; a plurality of transverse supports connected with the lower main support of said central part and a transverse support connected with the lower main support of each side part, said transverse supports of said side parts being connected with said transverse supports of said central part; and a plurality of connecting flanges arranged on said rear wall of said central part and a connecting flange on each side wall and connecting said upper and said lower main supports of said central part and said side parts with one another; connecting means for connecting said central part and said side parts, said connecting flanges connecting said upper and lower main supports and extending over a whole height of said rear walls.

2. A receiving table as defined in claim 1, wherein said transverse supports are formed as further connecting flanges and together with said first mentioned flanges are arranged in a full surface contact with end surfaces of said lower and upper main supports.

3. A receiving table as defined in claim 1, wherein said main supports are composed of hollow members.

4. A receiving table for harvesters, comprising a central part mountable on a harvester; two side parts connected with said central part along separating and connecting points, said central part and each of said side parts having a rear wall and a bottom wall; upper main support means including a plurality of upper main supports and lower main supports means including a plurality of lower main supports; a plurality of transverse supports arranged on said bottom walls said transverse supports being connected with said lower main supports and connecting said bottom walls of said central part and said side parts with one another; a plurality of connecting flanges arranged on said rear walls, said connecting flanges connecting said rear wall of said central part and said side parts with one another and also connecting said upper main supports and said lower main supports at said separating and connecting points, said transverse supports extending over a whole width of said bottom balls, said connecting flanges extending over a whole height of said rear walls; and means for releasably connecting said central part and said side parts with one another.

* * * * *